Figure 1:
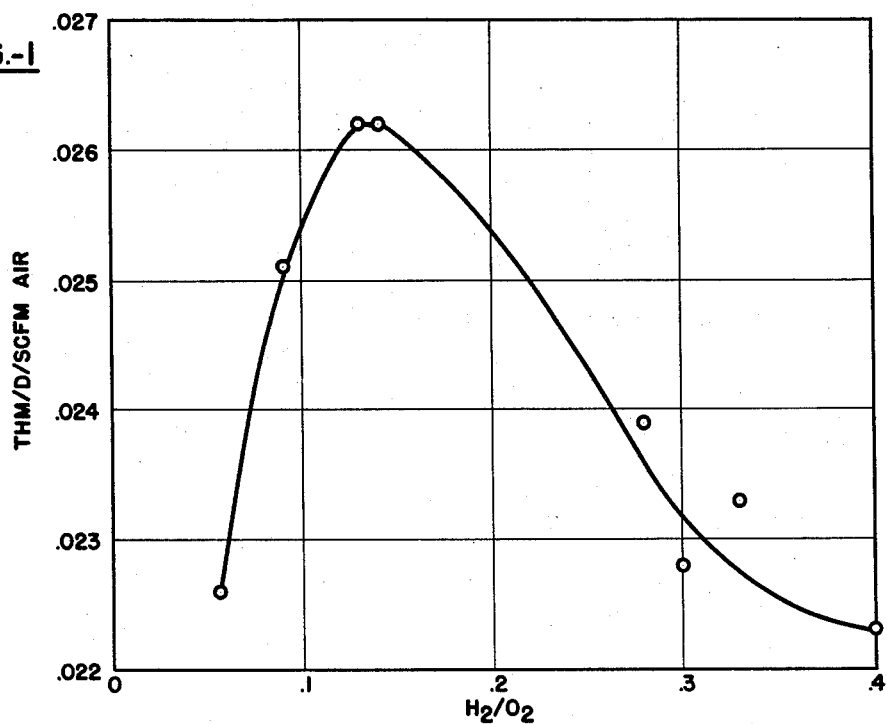

Ivan Mayer
Ronald V. Trense   INVENTORS

BY  R. P. Crowley

PATENT ATTORNEY

United States Patent Office 3,146,089
Patented Aug. 25, 1964

3,146,089
OPTIMIZING REDUCING GAS PRODUCTION
WITH HYDROGEN-CONTAINING FUELS
Ivan Mayer, Summit, and Ronald V. Trense, New Brunswick, N.J., assignors to Esso Research and Engineering Company, a corporation of Delaware
Filed Mar. 27, 1961, Ser. No. 98,346
8 Claims. (Cl. 75—41)

The present invention concerns gasification processes and particularly the reduction of metallic ores by reducing gases. More specifically, this invention relates to improvements in reduction of iron ore in shaft-type reduction furnaces by the more efficient utilization of reducing gas produced by the injection of fluid hydrogen-containing fuels. In particular, this invention relates to optimizing the economical operation of a blast furnace employing hydrocarbonaceous fuel by controlling the molar hydrogen-oxygen ratio of the furnace charge materials.

In gasification processes, gases such as town gas, reducing gas, water gas, and the like comprising hydrogen and carbon monoxide are generally produced by the reaction of a solid carbonaceous fuel such as coke, coal or carbon with air. These gases so produced may subsequently be utilized in metallurgical ore reduction or for other well known purposes.

In metallurgical processes, such as in iron blast furnace processes and in copper and lead smelters, metallic ores are reduced by reducing gases formed by a solid carbonaceous material, such as coal, coke or carbon, and a blast gas such as air, air enriched with oxygen, or even pure oxygen, either within the furnace or extraneous to the furnace, whereby the carbonaceous material is partially oxidized. When the gasification takes place within the furnace, the heat generated creates the desirable reduction temperature. The carbonaceous material is additionally utilized to produce a reducing gas mixture comprising carbon monoxide and hydrogen, i.e., from about 0.5 vol. percent to about 3.0 vol. percent $H_2$ and about 33 vol. percent to 38 vol. percent CO at temperatures ranging from about 3000° F. to 4000° F. The indirect reduction temperatures within the shaft-type furnaces used for the reduction of iron ore range from about 600° F. to about 1200° F. or even as high as 1600° F.

In the operation of a conventional blast furnace, the furnace is charged with iron ore (iron oxides and iron oxide precursors such as iron carbonates and hydrates), flux materials (limestone and/or dolomite) and carbonaceous materials (coke). This mixture is then heated in its descent down the shaft to drive off carbon dioxide and water. As the ore descends downward through the stack, it is reduced to iron by indirect reduction (solid-gas), i.e., by reducing gas moving in a countercurrent direction and by direct reduction (solid-solid) with solid carbon. The reduced iron is then melted in the lower bosh portion of the furnace, and the liquid metal withdrawn through the iron notch at the hearth. A blast furnace thus requires a source of reducing gas in the upper part of the stack to indirectly reduce and preheat the ore and a high temperature in the lower part of the stack (bosh section) sufficient to melt the reduced ore. Both requirements are generally provided for by introducing a heated blast gas such as air or oxygen-enriched air, i.e., air containing more than 21 wt. percent oxygen, such as between 21–30 wt. percent, or even pure oxygen, through a series of tuyeres located circumferentially around the bosh section of the furnace or even at other furnace levels such as through auxiliary tuyeres above the main tuyeres. The heated blast gas partially oxidizes the coke to furnish the necessary high temperature to melt the iron (3000 to 4000° F.) and provides a reducing gas to reduce the ore further up the stack. The blast gas may contain minor amounts of water vapor, such as between 1 to 30 grains of water per standard cubic foot. Blast gas is herein defined as any air or gaseous mixture introduced into a furnace to increase the combustion or oxidation of the furnace fuel and/or to provide the necessary elements for combustion or reduction, or both, of the ores with the assistance of the fuel coke and fluxes.

In the production of reducing gases for metallurgical processes, hydrogen-containing compounds, such as hydrogen itself, or, in particular, fluid hydrocarbonaceous fuels, have been suggested to replace part of the carbonaceous material. The reducing gas is produced by the partial combustion or cracking of the hydrocarbonaceous fuel. Suitable fuels for this purpose include liquid and gaseous fuels, such as a gaseous fuel like natural gas, acetylene, coal gas, coke oven gas, oil gas, light petroleum gases, for example, methane, ethane, propane, and by-product furnace gases and liquid fuels, such as petroleum-type residual fuel oils; distillate fuel oils derived from crude petroleum by distillation, thermal cracking, catalytic cracking, hydroforming and the like; crude petroleum; diesel fuels; gas oils; kerosene; gasoline; and petroleum naphthas. For economic reasons, those liquid fuel oils of ASTM Specification D–396–48T will generally be preferred with the residual fuel oils 5 and 6, called Bunker C fuels, being especially preferred. In some geographic areas, circumstances will justify the use of natural gas comprising about 90% methane with light hydrocarbons through $C_4$ making up the balance.

The injection of hydrocarbonaceous fuels described in the lower portion of the furnace generally requires the adjustment of blast furnace operating variables so that the hydrocarbon injection rate should be tailored to the oxygen and moisture content of the blast gas, the blast gas temperature, and the like in order to maintain a suitable temperature level in the bosh zones and furnace operating conditions. Where hydrocarbon fuels are employed, the blast gas, i.e., the blast air, is normally employed at a pressure of from 5 to 40 p.s.i.g. and a wind rate of from 1000 to 8000 s.c.f./m. per tuyere.

It has been discovered by the applicants that the production and utilization of reducing gases both in gasification processes and particularly in shaft-type furnaces can be maximized by controlling the molar hydrogen to oxygen ratio of the furnace charge. Thus, it has been found that by employing a certain optimum and critical range of molar hydrogen to oxygen ratio through maintaining the proper stoichiometric material balance fed to the furnace, yet still maintaining the proper heat balance, the reducing gas utilization in the furnace or the reactor capacity of the gasification process is increased far beyond normal expectations. Thus, for example, by controlling the rate of injection of a fluid hydrogen-containing fuel, e.g., a particular fluid hydrocarbon fuel such as Bunker C oil or natural gas, a surprising increase in the reduction efficiency of the reducing gas in a blast furnace has been discovered. In gasification processes, the benefits of the invention are obtained by maintaining the $H_2/O_2$ molar ratio between the critical limits of 1.26 to 1.79. In blast furnace operations wherein a reducing gas is produced and utilized within the furnace, a critical $H_2/O_2$ range of between 0.10 and 0.30, depending on the particular ore and furnace charge, and particularly between 0.10 and 0.20, has been discovered. Operation within these ranges yields many beneficial results, such as increased efficiency of reducing gas utilization, lower top gas temperature, increased thermal efficiency, increased furnace or reactor capacity, and other benefits. The simplest operating materials and variables which would normally be controlled to maintain the proper and most economical $H_2/O_2$ ratio would be the type of hydrocarbon fuel utilized, the rate of injection, the concentration of oxygen in the blast gas, and other factors within the control of the one skilled in the art.

In most metallic oxide reduction processes, as the reducing gas moves up the shaft, the metal oxide is reduced. A known measure of the efficiency of the reduction process in the shaft can be obtained by examining the gaseous mixture emerging from the top of the stack or from the gaseous mixture leaving the reduction zone. The normal measure of efficiency is the molar ratio of carbon monoxide to carbon dioxide and the molar ratio of hydrogen to water in the emerging gases. A reduction in the $CO/CO_2$ and/or $H_2/H_2O$ ratio would be indicative of increased efficiency in the reducing gas utilization and would be expected to yield increased blast furnace production capacity and reduced fuel requirements for a unit of hot metal production. The $CO/CO_2$ molar ratio is defined as the true molar ratio exclusive of $CO_2$ contributions from carbonates in the burden. Similarly, the $H_2/H_2O$ ratio is exclusive of moisture in the burden.

Increased gas utilization in accordance with this invention is normally effected by employing a range of low injection rates of the hydrogen-containing fuel or by controlling the oxygen content or wind rate of the blast gas or combinations thereof. These methods are the simplest methods of controlling and maintaining the proper $H_2/O_2$ molar ratio. The reduction reaction rates generally increase with increased $H_2/O_2$ ratio, while the gasification reaction rates generally decrease with increased $H_2/O_2$ ratio. Reduction reactions may be expressed by (1) 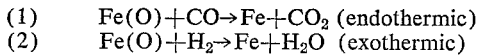 $Fe(O) + CO \rightarrow Fe + CO_2$ (endothermic)
(2) $Fe(O) + H_2 \rightarrow Fe + H_2O$ (exothermic)

while gasification reactions are defined by (3) 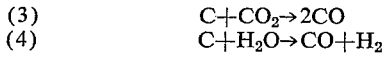 $C + CO_2 \rightarrow 2CO$
(4) $C + H_2O \rightarrow CO + H_2$ At the point where these reaction rates cross, i.e., at the point where they are similar, called the equilibrium position increasing the $H_2/O_2$ ratio, such as by higher injection rates of the hydrogen-containing fuel or employing a hydrocarbon fuel having a higher hydrogen to carbon ratio would not increase the rate of reduction in the shaft since the additional hydrogen would not reduce the iron ore. For example, the minimum ratio of carbon monoxide to carbon dioxide which will permit the reduction of iron at 1000° F. is about 0.91, at 2000° F. is about 2.94, and at 3000° F. is about 5.00. It would be expected that operations using coke alone or the highest possible oil-coke hydrocarbon injection rates at, near or approaching this equilibrium condition would theoretically be the most desirable method of operation, especially where the fuel is more economical than the coke replaced. Contrary to expectations, the applicants have discovered that there exists an unexpected critical range of $H_2/O_2$ ratio in which the most efficient operations are possible.

In determining the molar $H_2/O_2$ ratio, the hydrogen content is defined as the total hydrogen content from all sources provided in the blast gas, such as in the hydrogen-containing fuel, the blast water vapor, steam, and so forth and plus the hydrogen available from the coke or solid carbonaceous material. The molar oxygen content is defined as the total oxygen content from all sources provided in the blast gas, such as in the blast air, the oxygen-enriched blast gas, in the blast water vapor, and so forth, plus the oxygen available from the metallic ores, such as the iron ore, and so forth. The molar hydrogen to oxygen ratio is further defined as being exclusive of the oxygen and hydrogen present in the moisture in the ore and the burden and exclusive of the oxygen content in the carbonates in the burden, such as the carbonates of iron, manganese, alkali and alkaline earth metals, and other readily decomposible carbonates in the burden charge. From the foregoing, the simplest major variables that may be utilize dto obtain maximum reducing gas utilization are the oxygen content of the blast gas and the injection rate of the particular fuel employed or a combination of both methods.

Even though steam addition to the blast gas may also be used in this control scheme, complete exclusion of steam yields the most efficient operation.

EXAMPLE 1

The advantages of the present inventive process are demonstrated by data obtained from the operation of a pilot plant blast furnace as shown in Table I. The fuel injected through the tuyeres of the furnace into the bosh section was a heavy residual Bunker C type fuel oil comprising about 85% by weight carbon, 11% by weight hydrogen, and about 2.5% by weight sulfur.

*Table I*
EFFECT OF LOW INJECTION FUEL RATES ON FURNACE EFFICIENCY

| Time period | A32 | B32 | C32 | D32 | A33 | B33 | C33 | D33 |
|---|---|---|---|---|---|---|---|---|
| Prod. rate, tons/day (T/D) | 31.58 | 34.54 | 37.3 | 37.2 | 31.86 | 32.58 | 31.75 | 32.83 |
| Hot blast gas temperature (HBT) | 1,664 | 1,864 | 2,007 | 2,074 | 1,787 | 1,886 | 1,971 | 1,790 |
| Wind rate, s.c.f.m | 1,391 | 1,371 | 1,372 | 1,366 | 1,400 | 1,396 | 1,424 | 1,374 |
| Air, M.s.c.f./t.h.m | 63.44 | 57.15 | 52.96 | 52.87 | 63.29 | 61.7 | 64.57 | 60.29 |
| Coke rate, lbs./t.h.m | 1,270 | 1,143 | 1,050 | 1,019 | 979 | 917 | 856 | 977 |
| Oil rate, lbs./t.h.m | 0 | 40.4 | 78.65 | 88.92 | 261.66 | 302.86 | 367.21 | 253.4 |
| Oil rate, gal./hr | | 7.2 | 14.98 | 17.18 | 42.81 | 50.57 | 60.43 | 43.3 |
| Million B.t.u./t.h.m.: | | | | | | | | |
| Coke heat | 15.53 | 14.00 | 12.86 | 12.48 | 12.00 | 11.23 | 10.50 | 11.99 |
| Oil heat | 0 | .72 | 1.42 | 1.60 | 4.71 | 5.45 | 6.79 | 4.56 |
| Air heat | 2.00 | 2.06 | 2.06 | 2.14 | 2.18 | 2.25 | 2.48 | 2.08 |
| Total | 17.53 | 16.78 | 16.34 | 16.22 | 18.89 | 18.93 | 19.77 | 18.63 |
| Top gas analysis: | | | | | | | | |
| Vol. percent CO | 27.3 | 26.6 | 26.7 | 26.5 | 25.5 | 25.7 | 25.8 | 26.1 |
| Vol. percent $CO_2$ | 13.0 | 13.7 | 14.0 | 14.6 | 11.8 | 11.8 | 12.0 | 12.3 |
| Vol. percent $H_2$ | 1.4 | 1.9 | 2.6 | 2.9 | 5.0 | 5.6 | 6.5 | 4.8 |
| $CO/CO_2$ ratio | 2.10 | 1.94 | 1.91 | 1.82 | 2.16 | 2.18 | 2.15 | 2.12 |
| Top gas temp., °F | 557 | 469 | 469 | 468 | 656 | 707 | 670 | 655 |
| Replacement ratio, lb. oil/lb. coke | | 0.37 | 0.41 | 0.40 | 0.93 | 0.90 | 0.94 | 0.90 |
| $H_2/O_2$ | .057 | .09 | .13 | .14 | .30 | .33 | .40 | .28 |

NOTES.—(1) Moisture in blast gas was 7 grains/s.c.f. for all periods except C33 when it was 11 grains/s.c.f.
(2) Coke 12,250 B.t.u./lb.; oil 18,000 B.t.u./lb.
LEGEND.—t.h.m.—Short tons of hot metal; s.c.f.m.—Standard cubic feet per minute; M.s.c.f.—Thousand standard cubic feet.

The above data demonstrate that it has been discovered that contrary to prior expectations there does not exist a proportional increase in efficiency with hydrogen-containing fuel, but rather there exists a narrow critical range of injection rates for a particular fuel, in which range extremely efficient and economical operation is possible. Thus, it can be seen that, by employing coke alone without the introduction of a hydrogen-containing fuel, the carbon monoxide-carbon dioxide ratio of the top gas was about 2.10. The use of low injection rates of the residual fuel, for example, using pounds of oil per ton of hot metal, ratios of from 40 to 160, and especially 40 to 90 gave much lower $CO/CO_2$ ratios, demonstrating maximum utilization of the reducing gas in the shaft. Increasing fuel injection rates above 42 gallons per hour or replacement ratios above 0.9 gave reducing gas efficiency in the reduction zone of even less than that with coke alone. The correlation of the $CO/CO_2$ ratio with efficiency is also supported by the increased production rate of the furnace and the lower top gas temperatures at the low injection rates.

It should be noted that the operations on coke alone (A32) include some oxygen and hydrogen from the moisture and hydrogen in the coke and moisture in the blast gas. This explains the molar $H_2/O_2$ ratio of 0.057 on the blast furnace operation with coke alone. From the foregoing data, the maximum and minimum hydrocarbon injection rates which would produce the desired molar hydrogen to oxygen ratios of from 0.1 to 0.3 for a hydrocarbon containing about 12 wt. percent to 25 wt. percent hydrogen, respectively, would be about 20 to 290 pounds of hydrocarbon fuel/t.h.m., for example, 48 to 287 pounds/t.h.m. for Bunker C fuel and 23 to 137 pounds/t.h.m. for a natural gas like methane. The upper and lower limits correspond to the 0.1 and 0.3 hydrogen to oxygen ratios with an assumed oxygen input/t.h.m. of about 59 to 69 moles. Base operations with normal coke alone considering blast gas moisture content of about 7 grains/s.c.f. would give a hydrogen to oxygen ratio of about 0.05. In order to obtain the benefits of this invention, hydrogen-containing fuel injection rates as above are required.

Figure 2:
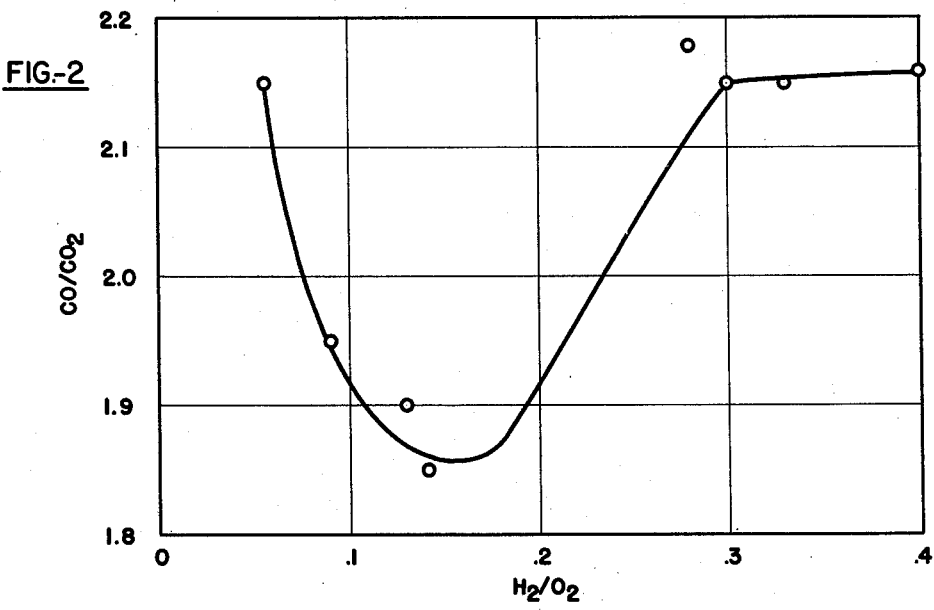

A graphical demonstration of the data of Example 1 is presented in FIGURES 1 and 2.

FIGURE 1 represents the graphical plot of the short tons of hot metal per day per standard cubic foot per minute of blast air vs. the molar hydrogen to oxygen ratio. From this graph, the criticality and importance of maintaining the discovered molar ratio within the defined limits is apparent in order to obtain maximum thermal efficiency.

FIGURE 2 concerns the graphical representation of the molar $CO/CO_2$ ratio of the top gas vs. the molar $H_2/O_2$ ratio of the blast furnace charge. This graph again indicates the critical limitations of the molar ratio and increased reducing gas efficiency in the furnace that may be obtained by employing the disclosures of the invention. Thus, the invention will allow a $CO/CO_2$ ratio of from 0.5 to 2.0, or even 2.0 to 1.8.

An examination of the total hydrogen, carbon and oxygen material balances of the operating data of Example 1 will reveal that the present invention is broadly applicable to all hydrogen-containing fuels. Further, control of operating variables, i.e. material balances, so as to obtain a $H_2/O_2$ ratio of from 0.10 to 0.30 and preferably from 0.10 to 0.20, will allow surprisingly economical operational efficiency, both in regard to higher production ouput, increased furnace capacity, lower top gas temperature, e.g., 450–525° F., increased thermal capacity, increased hydrogen and CO utilization, and permit maximum blast air temperature to be employed along with other beneficial effects. Table II which follows gives the material balances calculated from the operating data of Example 1.

*Table II*

HYDROGEN, CARBON, AND OXYGEN MATERIAL BALANCES

| Time period | Hydrogen Balances | | | | | | | |
|---|---|---|---|---|---|---|---|---|
| | A32 | B32 | C32 | D32 | A33 | B33 | C33 | D33 |
| Input, lb. mols/t.h.m.: | | | | | | | | |
| Blast Moisture | 3.54 | 3.19 | 2.96 | 2.95 | 3.54 | 3.50 | 5.66 | 3.36 |
| Coke | 1.91 | 1.71 | 1.58 | 1.53 | 1.47 | 1.38 | 1.28 | 1.47 |
| Oil | | 2.18 | 4.25 | 4.55 | 14.29 | 16.54 | 20.05 | 13.96 |
| | 5.45 | 7.08 | 8.79 | 9.03 | 19.30 | 21.42 | 26.99 | 18.79 |
| Output, lb. mols/t.h.m.: Top Gas $H_2$ | 3.20 | 3.95 | 5.09 | 5.73 | 11.48 | 12.96 | 15.83 | 10.73 |
| Percent $H_2$ utilization | 41.3 | 44.2 | 42.1 | 36.5 | 40.5 | 39.5 | 41.3 | 42.9 |
| | Carbon Balances | | | | | | | |
| Input, lb. mols/t.h.m.: | | | | | | | | |
| Coke | 97.29 | 87.56 | 80.43 | 78.06 | 74.34 | 69.63 | 65.00 | 74.19 |
| Oil | | 2.87 | 5.62 | 6.00 | 18.54 | 21.46 | 26.02 | 17.88 |
| $CO_2$ from burden | 0.57 | 0.63 | 0.44 | 0.42 | 1.52 | | 0.01 | 0.01 |
| | 97.86 | 91.46 | 86.49 | 84.48 | 94.40 | 91.09 | 91.03 | 92.08 |
| Output, lb. mols./t.h.m.: | | | | | | | | |
| Top gas | 92.02 | 83.76 | 79.78 | 81.21 | 85.59 | 86.86 | 92.10 | 85.85 |
| Hot metal | 7.79 | 7.76 | 7.86 | 7.51 | 7.61 | 7.48 | 7.13 | 7.43 |
| | 99.81 | 91.52 | 86.64 | 88.72 | 93.20 | 94.34 | 99.23 | 93.28 |
| | Oxygen Balances | | | | | | | |
| Input, lb. atms./t.h.m.: | | | | | | | | |
| Dry blast | 70.26 | 63.30 | 58.65 | 58.56 | 70.10 | 69.44 | 71.51 | 66.77 |
| Blast moisture | 3.54 | 3.19 | 2.96 | 2.95 | 3.54 | 3.50 | 5.66 | 3.36 |
| Fe reduction | 46.61 | 46.58 | 46.62 | 46.66 | 48.79 | 47.42 | 48.12 | 47.44 |
| Mn, P, Si | 1.75 | 1.83 | 1.64 | 1.76 | 1.89 | 1.84 | 1.77 | 1.81 |
| $CO_2$ from burden | 1.15 | 1.27 | 0.87 | 0.84 | 3.04 | | 0.02 | 0.02 |
| Coke | 0.48 | 0.43 | 0.39 | 0.38 | 0.37 | 0.34 | 0.24 | 0.37 |
| | 123.79 | 116.60 | 111.13 | 111.15 | 127.73 | 122.54 | 127.32 | 119.77 |
| Output, lb. atms./t.h.m.: Top gas | 124.86 | 116.62 | 110.92 | 113.37 | 121.91 | 124.04 | 134.45 | 122.76 |
| $CO/CO_2$ ratio ex burden $CO_2$ | 2.15 | 1.95 | 1.90 | 1.85 | 2.15 | 2.15 | 2.16 | 2.18 |
| $H_2/O_2$ | .057 | 0.09 | 0.13 | 0.14 | 0.30 | 0.33 | 0.40 | 0.28 |

The above data demonstrate that the economically critical range for operation with injected fuels can be obtained by any method of control whereby the overall $H_2/O_2$ ratio is controlled within the desired critical limits. Thus, any of the variables containing hydrogen, oxygen, or carbon may be varied and the benefits of the invention obtained.

Also apparent from the foregoing is that by reducing the diluent gases such as nitrogen in the air blast, as by increasing the oxygen concentration, say to 25–28% in the blast permits increasing the injection rate or type of hydrogen-containing fuel employed without exceeding the critical $H_2/O_2$ ratios. This would be of great advantage where the fuel employed is cheaper than the coke replaced. In the inventive process, furnace burden composition may be of natural ore, sinter, or pellets, or combinations thereof.

EXAMPLE 2

Additionally, the principles of this invention may be employed in extraneous reducing gasification processes such as in the production of town gas, reducing gas, or water gas in moving, fixed and fluid bed operations. Where reducing gases consisting essentially of carbon monoxide and hydrogen are produced, control of the $H_2/O_2$ ratio of from 1.2 to 1.8, for example, at normal gasification temperatures of 1800° F. to 2400° F., by regulating the stoichiometric balances of the materials fed to the process will allow a minimum reactor volume to be obtained for a given amount of gasification. For example, in the production of water gas from Bunker C in a fluid coke bed formed in the process of gasification or by petroleum coke while gasifying the same amount of carbon per unit time, controlling the injection rate of the air and the residual fuel such as Bunker C or a fuel having a hydrogen-carbon atomic ratio of from 1.2 to 1.8 to control the $H_2/O_2$ ratio at a temperature of 2000° F. calls for the following reactor requirements as a function of the $H_2/O_2$ ratio.

Table III
EFFECT OF CONTROLLING $H_2/O_2$ RATIO IN A GASIFICATION PROCESS

| $H_2/O_2$ mol ratio | Lbs. of carbon inventory/mols of oxygen/hr. |
|---|---|
| 0 | 539 |
| .358 | 463 |
| .7165 | 440 |
| 1.256 | 430 |
| 1.433 | 426 |
| 1.612 | 430 |
| 1.792 | 433 |
| 2.77 | 459 |
| 3.96 | 501 |

As can be seen by the above data, gasification within the critical $H_2/O_2$ range of 1.26 to 1.79, and preferably from 1.2 to 1.5 would yield unexpected benefits in regards to reactor volume and efficiency. The reducing gas so produced could, of course, be then utilized in a furnace wherein the further control of the $H_2/O_2$ would continue to maximize efficiency.

What is claimed is:

1. In the reduction of iron ore in a blast furnace wherein a charge is introduced to said furnace consisting of coke, metal ore, blast air and an auxiliary fluid hydrogen-containing fuel, some moisture and readily decomposable carbonates, the improvement in the process comprising controlling the relative amounts of hydrogen and oxygen being injected into said furnace by maintaining a molar hydrogen to oxygen ratio of from 0.10 to 0.30 in the materials charged, said materials charged being exclusive of the moisture and the readily decomposable carbonates in the charge.

2. In the process as defined in class 1 wherein said hydrogen/oxygen ratio is adjusted by controlling the rate of injection of a liquid residual petroleum fuel oil to give a ratio of from 48 to 287 pounds of oil to short tons of hot metal produced.

3. A process as defined by claim 1 wherein said hydrogen-containing fuel is a residual petroleum fuel oil.

4. A process as defined by claim 1 wherein said hydrogen-containing fuel is natural gas.

5. A process as defined by claim 1 wherein said hydrogen-containing fuel is injected in conjunction with heated blast air having an oxygen concentration of greater than 21 wt. percent.

6. A process as defined by claim 1 wherein the ratio of carbon monoxide to carbon dioxide in the gaseous stream leaving the shaft at a temperature of from 450 to 500° F. is from 0.5 to 2.0.

7. A process as defined by claim 1 wherein said molar hydrogen to oxygen ratio is from 0.10 to 0.20.

8. A process as defined by claim 1 wherein the injection rate of the hydrogen-containing fuel is between 48 to 287 pounds of fuel per ton of hot metal produced.

References Cited in the file of this patent

UNITED STATES PATENTS

| 1,394,043 | Smith | Oct. 18, 1921 |
| 2,219,046 | Koller et al. | Oct. 22, 1940 |
| 2,420,398 | Kinney | May 23, 1947 |
| 2,707,148 | Kollgaard | Apr. 26, 1955 |
| 2,719,083 | Pomykala | Sept. 27, 1955 |
| 2,970,901 | Rice | Feb. 7, 1961 |

OTHER REFERENCES

Blast Furnace, Coke Oven, and Raw Materials Proceedings, 1960, vol. 19, pages 238–300.